C. WEBER.
ARTICLE OF MANUFACTURE AND PROCESS FOR MAKING THE SAME.
APPLICATION FILED SEPT. 14, 1918.
1,350,533. Patented Aug. 24, 1920.
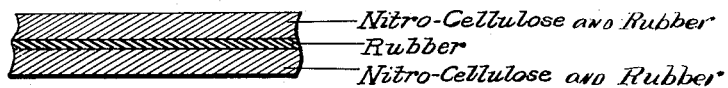
Nitro-Cellulose and Rubber
Rubber
Nitro-Cellulose and Rubber
Inventor
Charles Weber
By Foster Freeman Watson & Coit
Attorney

UNITED STATES PATENT OFFICE.

CHARLES WEBER, OF NEWARK, NEW JERSEY.

ARTICLE OF MANUFACTURE AND PROCESS FOR MAKING THE SAME.

1,350,533.   Specification of Letters Patent.   Patented Aug. 24, 1920.

Application filed September 14, 1918. Serial No. 254,050.

*To all whom it may concern:*

Be it known that I, CHARLES WEBER, a citizen of the United States, residing at Newark, county of Essex, State of New Jersey, have invented certain new and useful Improvements in Articles of Manufacture and Processes for Making the Same, of which the following is a specification.

This invention relates to an article of manufacture in the form of a sheet of material having a novel structural formation and novel functional characteristics and advantages. It is particularly useful in making containers such as tubes for liquid or fluid substances which require substantially water-proof material, since it is flexible, tough and practically unbreakable and is substantially impervious to the passage of water or volatile liquids. It may also be substantially transparent. My invention includes the process of manufacture and the novel features will be apparent from the following specific description and claims.

In the drawing I have illustrated on an enlarged scale and in section, one form of sheet embodying my invention, and have applied thereto descriptive terms indicating the character of the layers in this form.

The article constituting the present invention is composed largely of nitro-cellulose or similar material but is made up of a plurality of layers which are intimately united forming a coherent sheet and at least one of the layers is composed of or embodies rubber or its equivalent and is thus when dry non-porous, non-absorbent, waterproof, adhesive and flexible. The composition of the various layers may vary within rather wide limits and, therefore, the invention in its broad aspects is not limited to the specific compositions used or hereinafter described. I will, however, describe several specific ways of making the article.

A solution may be made of nitro-cellulose or equivalent, according to the usual or known method and may then be brought into the desired sheet form and allowed to dry. A convenient way of forming a sheet of material which may be in the shape of a tube is to dip a former in the solution and when the former is withdrawn a film of the solution will be on its surface and will harden and dry when exposed to the air. After drying the former with the hardened coating on it may be again dipped in the solution thus adding to the thickness of the sheet.

A rubber solution is also made in a known way which may consist of rubber, benzol, toluol, or other volatile oil or solvent. Instead of the pure rubber a rubber substitute may be used. The tube of nitro-cellulose after drying and while still on the former may be dipped in the rubber solution forming a rubber coating which is allowed to dry. The two layers adhere together forming a coherent sheet. The tube may then be dipped in the nitro-cellulose solution and allowed to dry, thus forming an outer layer of nitro-cellulose on the rubber layer. I find that the result may be a sheet which is practically transparent.

Instead of making the outer layers of nitro-cellulose or equivalent, I may make them from a solution composed of a mixture of the nitro-cellulose solution and the rubber solution. These two solutions are mixed in proper proportions in accordance with the character of the result or product desired. The characteristics of the product will vary somewhat with variations in the proportions and my invention therefore is not limited to any specific proportion. Useful results and products have, however, been produced where the rubber solution constituted from 5 to 15% of the total volume of the mixture.

The sheet or layer formed of this mixture is substantially transparent and tough and is sufficiently impervious to the passage of water to serve as a satisfactory container for ointments or other similar substances that contain liquids that tend to evaporate. According to my invention the sheet may be made of several layers of this mixture, together with a rubber layer. However, a satisfactory sheet may be made from layers of nitro-cellulose and a layer of this mixture, since the layer containing the mixture adds strength, toughness and imperviousness to the passage of water.

The sheet of material made according to my invention can be bent back on itself without breaking and is practically unbreakable. It will, of course, be apparent that any number of layers desired may be used. The material may be dried on the former in any suitable way as by an air current.

While as above stated, the sheet of material made in accordance with my invention may be transparent, it may also be made opaque, and those skilled in the art of making nitro-cellulose solutions will know how to give it the degree of transparency desired or to give it any color desired.

The material of the tube aside from the rubber-like layer may consist of preparations made from nitro-cellulose with various solvents and admixtures, or preparations made from phenol and formaldehyde.

Having thus described the invention what is claimed as new and desired to be secured by Letters Patent is:

1. A flexible, tough and substantially water-proof sheet of material made up of uniform intimately united layers, one of said layers being composed of nitro-cellulose and rubber and the adjacent layer being composed of rubber.

2. A sheet of material including two layers of a mixture of nitro-cellulose and rubber and an intermediate layer of rubber all united into a solid coherent sheet.

3. The process which consists in mixing a nitro-cellulose solution with a solution consisting of rubber and a volatile oil or solvent forming a thin sheet of said mixture on a former and allowing said sheet to dry and harden on said former, forming a thin coating of a solution of rubber and a volatile solvent on said hardened sheet and allowing said coating to dry and harden on said sheet.

4. The process which consists in mixing a nitro-cellulose solution with a solution consisting of rubber and a volatile oil or solvent forming a thin sheet of said mixture on a former and allowing said sheet to dry and harden on said former, forming a thin coating of a solution of rubber and a volatile solvent on said hardened sheet and allowing said coating to dry and harden on said sheet forming a thin sheet of said mixture of nitro-cellulose and rubber on said hardened coating of rubber and allowing the sheet to dry and harden in place.

5. A flexible, tough and substantially waterproof coherent sheet of material composed principally of nitro-cellulose made up of uniform intimately united layers one of which consists of a thin layer of rubber, the rubber layer being directly united to the nitro-cellulose layers.

6. A flexible tough and substantially waterproof coherent sheet of material composed principally of nitro-cellulose made up of uniform intimately united layers one of which consists of a thin layer of a material which when dry is non-porous, non-absorbent, water-proof, flexible and adhesive and which is directly united to said nitro-cellulose layers.

7. The process which consists in forming a thin sheet on a former from a solution containing nitro-cellulose allowing said sheet to dry and harden on said former, forming on said hardened sheet a thin coating of a solution containing rubber and allowing said coating to dry and harden on said sheet.

8. The process which consists in forming a thin sheet on a former from a solution containing nitro-cellulose, allowing said sheet to dry and harden on said former, forming on said hardened sheet a thin coating of a solution containing a material which when dry is non-porous, non-absorbent, water-proof, flexible and adhesive and allowing said coating to dry and harden on said sheet.

9. A flexible tough and substantially water-proof coherent sheet of material composed principally of nitro-cellulose made up of a series of intimately united layers, an intermediate layer consisting of a thin layer of rubber directly united to the nitro-cellulose layers.

10. A flexible tough and substantially water proof coherent sheet of material composed principally of nitro-cellulose made up of a series of intimately united layers, an intermediate layer consisting of a thin layer of a material which when dry is non-porous, non-absorbent, water-proof, flexible and adhesive, and which is directly united to said nitro-cellulose layers.

In testimony whereof I affix my signature.

CHARLES WEBER.